UNITED STATES PATENT OFFICE.

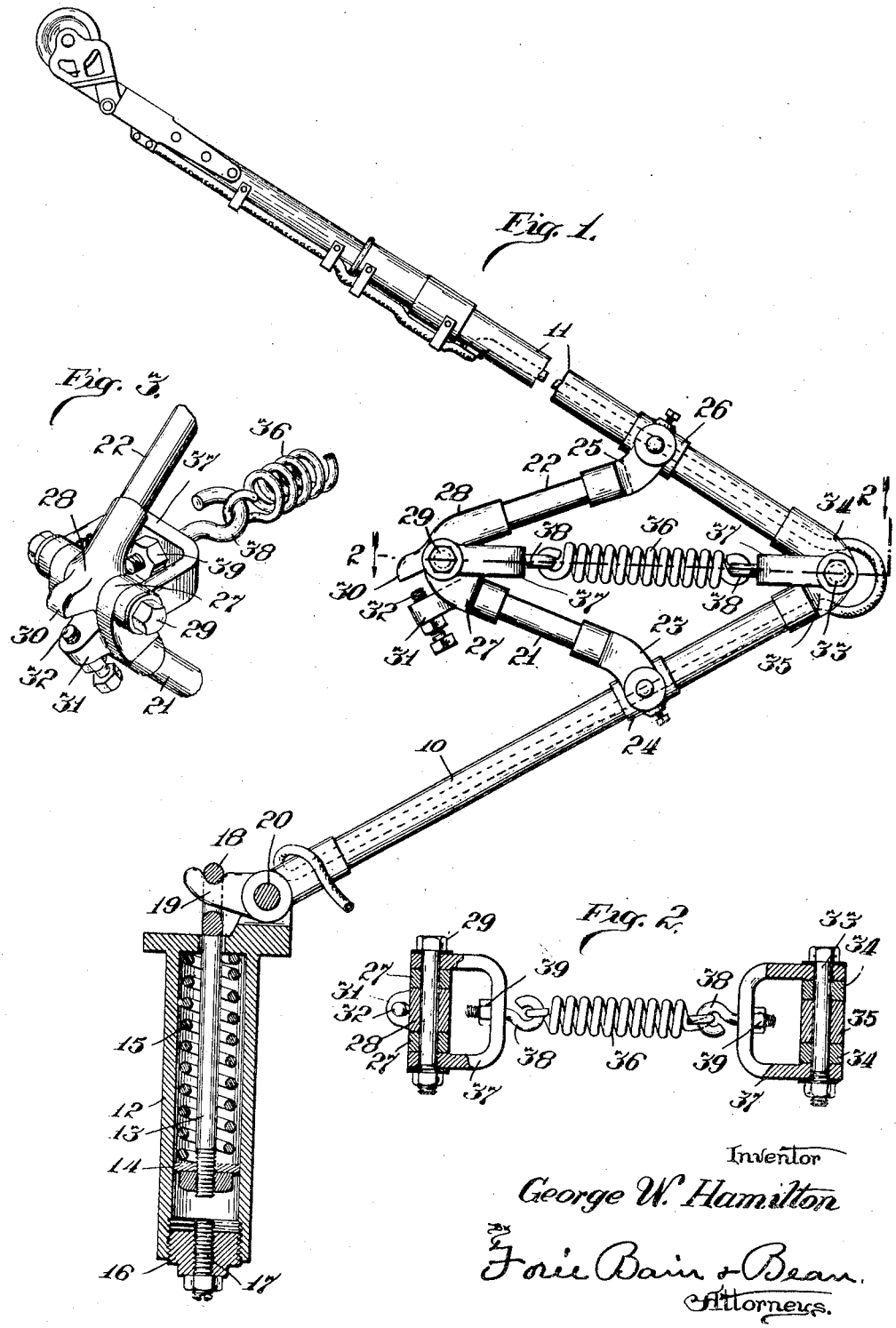

GEORGE W. HAMILTON, OF CHICAGO, ILLINOIS.

TROLLEY.

1,359,503.  Specification of Letters Patent.  Patented Nov. 23, 1920.

Application filed March 26, 1919. Serial No. 285,214.

*To all whom it may concern:*

Be it known that I, GEORGE W. HAMILTON, a citizen of the United States, residing at Chicago, in the county of Cook and State of Illinois, have invented certain new and useful Improvements in Trolleys, of which the following is a specification.

This invention relates to improvements in trolleys for electrically propelled locomotives or vehicles and while the embodiment of the invention illustrated in the drawings is designed particularly for use in connection with mine locomotives, the inventive idea may be readily adapted for use in connection with trolley poles of vehicles of various kinds.

The principal object of this invention is the provision of a trolley pole in which the trolley wheel may have an extended amount of travel with relatively light pressure forcing it against the wire to hold it in position, whereby the wear and breakage of the trolley wheel is materially reduced and the life and service thereof materially increased or lengthened.

Another object of this invention is the provision of a trolley pole composed of two parts hinged together, the outer or wire engaging part having a comparatively extended zone of movement independent of the other part and the latter part having a limited zone of movement, which movement occurs only after the outer part reaches the lower limit of its zone.

A further object of this invention is the provision of a trolley pole formed of two parts hinged together, the lower member having a resilient connection with the vehicle and a spring construction interposed between the upper and the lower member for yieldingly holding the upper member in position against the wire, this spring construction being arranged so as to force the trolley wheel against the wire with a very little pressure consistent with safety in keeping the wheel upon the wire.

Various other objects of this invention include improvements in details of construction and arrangement, whereby a simple and effectively operating device of this character is provided.

To the accomplishment of the foregoing and such other objects as may hereinafter appear, my invention consists in the construction, combination and arrangement of parts hereinafter described and then sought to be defined in the appended claim, reference being had to the accompanying drawing forming a part hereof and which shows, merely for the purpose of illustrative disclosure a preferred embodiment of my invention, it being expressly understood, however, that various changes may be made in practice within the scope of the claim without digressing from my inventive idea.

In the drawings—

Figure 1 represents a side elevation of a trolley pole constructed to embody my invention.

Fig. 2 represents a horizontal section taken substantially on line 2—2 of Fig. 1.

Fig. 3 represents a perspective view of the pivot or joint between the connecting members on the inside of the two main members of the trolley pole.

Broadly considered, my invention comprises the provision of two main members which are hinged together, having two connecting members pivotally connected thereto, so as to form a parallelogram within the angle between said two main members and having a spring connected to the joint or hinge of the two main members and the joint or hinge of the two connecting members extending across the parallelogram, in the form of a diagonal whereby the upper part of the pole may be depressed and the spring extended so that the pressure or tension of the spring is increased a comparatively small amount, notwithstanding the length of travel of the upper part of the pole. It is only after the upper member has been depressed to its lower limit, that the lower member will be depressed.

Referring now to the drawings for the particular embodiment of this invention, the numeral 10 designates the lower main member and the numeral 11 the upper main member, the latter preferably being considerably longer than the former. The first main member is pivotally or swingably mounted with reference to the locomotive or vehicle and is provided with resilient means for normally holding the same in an upright position. The form of means illustrated in the drawing includes the tubular member 12 within which is mounted the rod or plunger 13 having the washer 14 on its lower end and embraced by coil spring 15 which bears against the upper end of the tubular member. The open lower end of the tubular member is closed by means of a plug 16 having the adjusting screw 17 forming a stop to limit the downward movement of the rod or plunger 13 and consequently limit the upward movement of said member 10. The rod or plunger 13 is formed with an eye 18 to embrace the toe 19 on the end of member 10, the same being pivotally mounted on the tubular member, as at 20. This tubular member 12 is adapted to fit in a suitable receptacle on the top of the car or locomotive.

The connecting members are designated by the reference characters 21 and 22, the former terminating in the yoke member 23 which is pivotally connected to the sleeve 24, which is adjustable on the main member 10. The other connecting member 22 terminates in a similar yoke member 25 which is pivotally connected to the sleeve 26, which is adjustable on the other main member 11. The inner end of member 21 is forked, as at 27, to embrace the inner end 28 of member 22, pivot pin or bolt 29 passing therethrough to form the pivotal connection. The end 28 of member 22 is formed with a stationary or non-adjustable stop or abutment 30 while the end of member 21 is provided with an extension 31 to receive an adjusting screw 32 which forms an adjustable abutment adapted to coöperate with the abutment 30 on the end of member 2, whereby the upward movement of member 11 relative to member 10 is limited.

Members 10 and 11 are suitably pivoted together by means of the bolt or pivot 33 passing through the forked end 34 of one of the members and the end 35 of the other member, as shown to the right in Fig. 2 of the drawing. In order to position the spring 36 in the position of a diagonal of the parallelogram formed by the connecting members 21 and 22 and the main members 10 and 11, between the pivot pin or bolt 29 and the pivot pin or bolt 33, I utilize the yoke members 36, 37 which are mounted on said pivot pins or bolts 29 and 33 and which receive the hook members 38 which are adjustably held in position by means of the nuts 39. These hook members receive the ends of the spring 36, as clearly shown in all the figures of the drawing and also providing means whereby the tension of the spring 36 may be adjusted according to working conditions as desired.

It is therefore seen that I have provided a trolley pole which may have an extended movement or play to accommodate a widely varying head room without materially increasing the pressure of the trolley wheel against the wire. The expansion of spring 36 due to depression of the member 11 of the trolley pole is reduced and therefore the increase in pressure of the trolley wheel against the wire is also reduced. Of course, it is understood that when the upper member 11 is depressed to a certain point, yoke members 36, 37 will be engaged and the member 10 will then be depressed, spring 15 permitting this action, but ordinarily member 11 with its spring holding means will operate alone without the necessity of depressing member 10 against the tension of spring 15.

Having described my invention, what I claim is:—

The combination in a trolley pole, of two pole members hinged together; a pair of links hinged together; hinged members on each of the extended ends of the links for longitudinal adjustment on the pole members; means for adjusting said hinged members; a yoke, pivoted to the pole hinge and a yoke pivoted to the hinge that joins the link members; a spring extending between the two yokes and an adjustable stop to limit the movement of the hinged members.

In testimony whereof I hereunto subscribe my name.

GEORGE W. HAMILTON.